M. DIEFENDERFER.
VEHICLE BODY.
APPLICATION FILED DEC. 4, 1920.
1,431,783.
Patented Oct. 10, 1922.
3 SHEETS—SHEET 1.
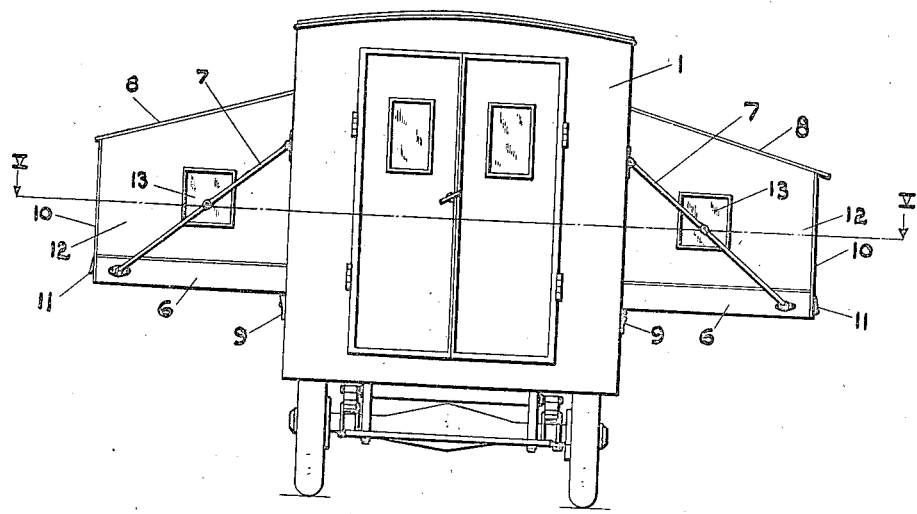
Fig. I
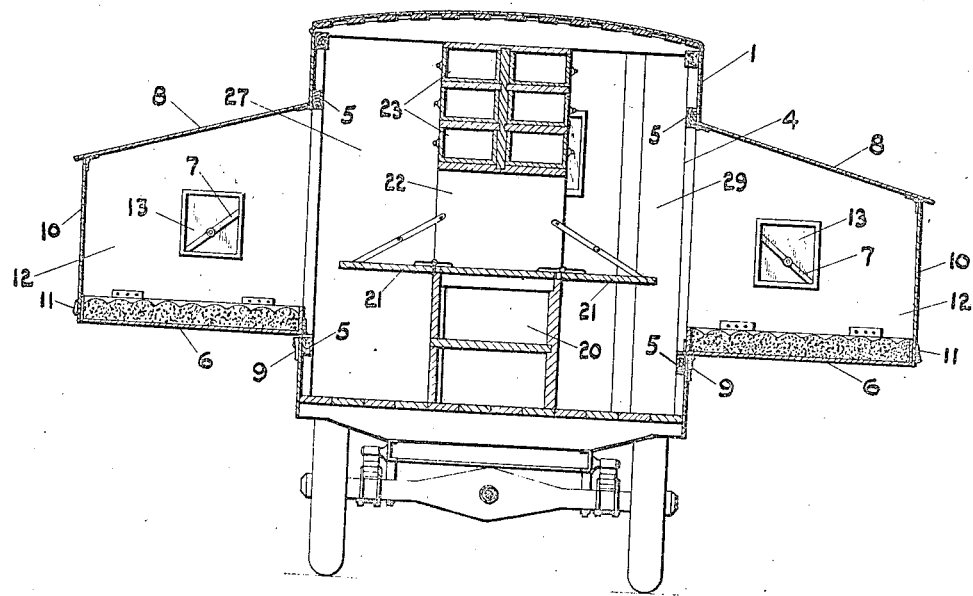
Fig. II
INVENTOR.
Martin Diefenderfer
BY *O. Marshall*
ATTORNEY.

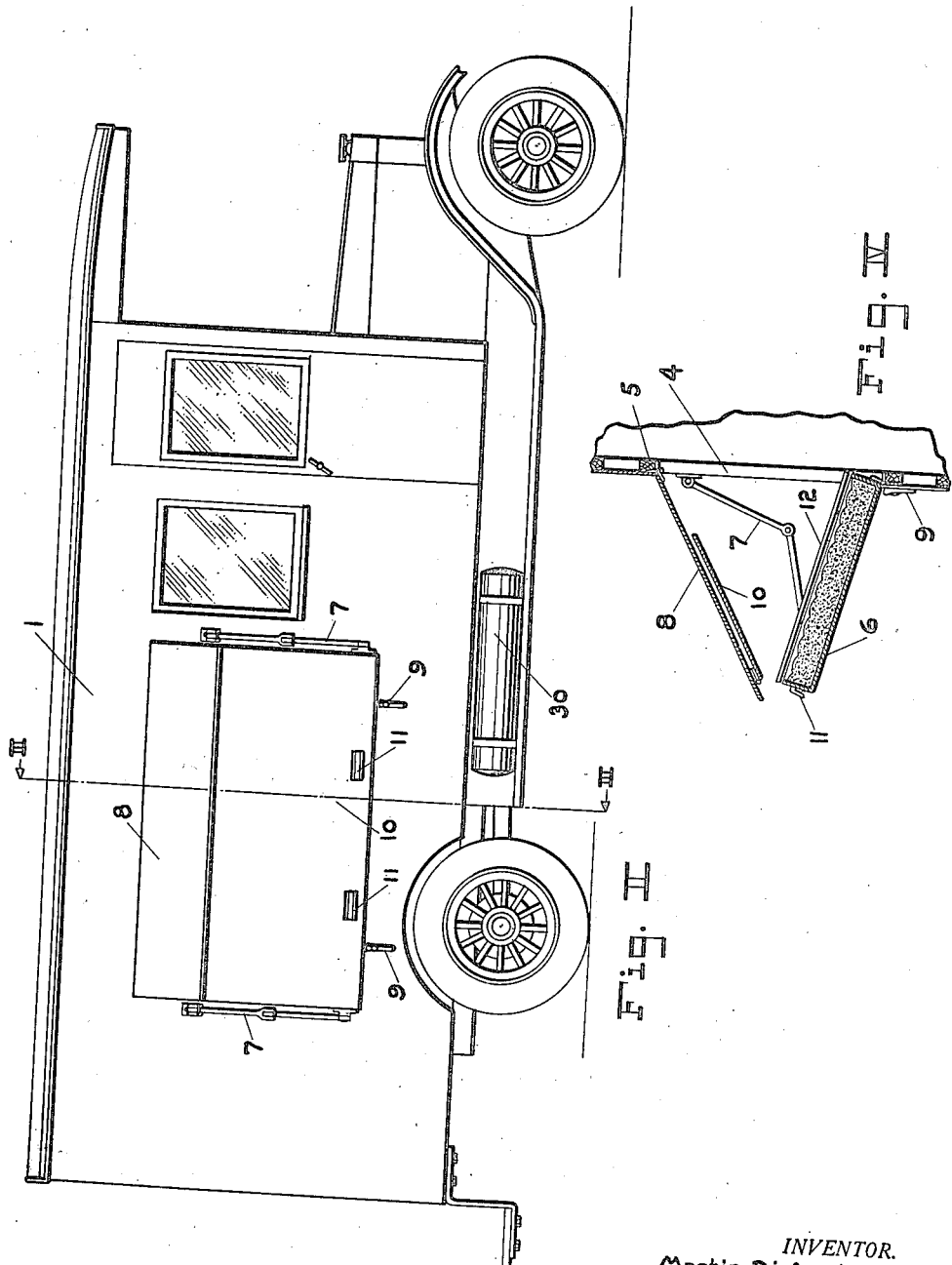

M. DIEFENDERFER.
VEHICLE BODY.
APPLICATION FILED DEC. 4, 1920.

1,431,783.

Patented Oct. 10, 1922.
3 SHEETS—SHEET 3.

INVENTOR.
Martin Diefenderfer
BY C.B. Marshall
ATTORNEY.

Patented Oct. 10, 1922.

1,431,783

UNITED STATES PATENT OFFICE.

MARTIN DIEFENDERFER, OF SOUTH PASADENA, CALIFORNIA.

VEHICLE BODY.

Application filed December 4, 1920. Serial No. 428,253.

*To all whom it may concern:*

Be it known that I, MARTIN DIEFENDERFER, a citizen of the United States, residing at South Pasadena, in the county of Los Angeles and State of California, have invented new and useful Improvements in Vehicle Bodies, of which the following is a specification.

This invention relates to vehicle bodies, and particularly to bodies constructed and arranged to be used as portable houses for cross country traveling and camping expeditions.

One of the objects of the invention is to provide means for expanding the interior of the vehicle body by providing foldable alcoves which extend from its sides when unfolded.

Another object is to provide a vehicle body, launch cabin or the like having a foldable table and folding alcoves containing beds which serve as seats adjacent the table when the table and alcoves are unfolded for use.

Another object is to provide a combined refrigerator, folding table, and chest of drawers.

Another object of the invention is to provide a cover for a folding bed which forms a part of the wall of a vehicle body, the cabin of a launch, or a building when the bed is not in use, and forms a roof or cover for the bed when it is turned down into horizontal position for use.

Another object is to provide a bed which extends exteriorly from the vehicle body or building and is accessible from the interior when in position for use.

Another object is to provide a covering for such a bed which forms part of the wall when the bed is folded and forms an alcove communicating with the interior when the bed is let down for use.

Still another object is to provide a foldable housing for a bed which serves to assist in supporting the bed in horizontal position.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear view of a vehicle embodying my invention, the beds being let down and enclosed in the foldable housing;

Figure 2 is a side elevation of the body with the alcoves unfolded;

Figure 3 is a vertical section through the body, showing the beds and table in position for use;

Figure 4 is a fragmentary sectional view showing the bed partially folded; and

Figure 5:
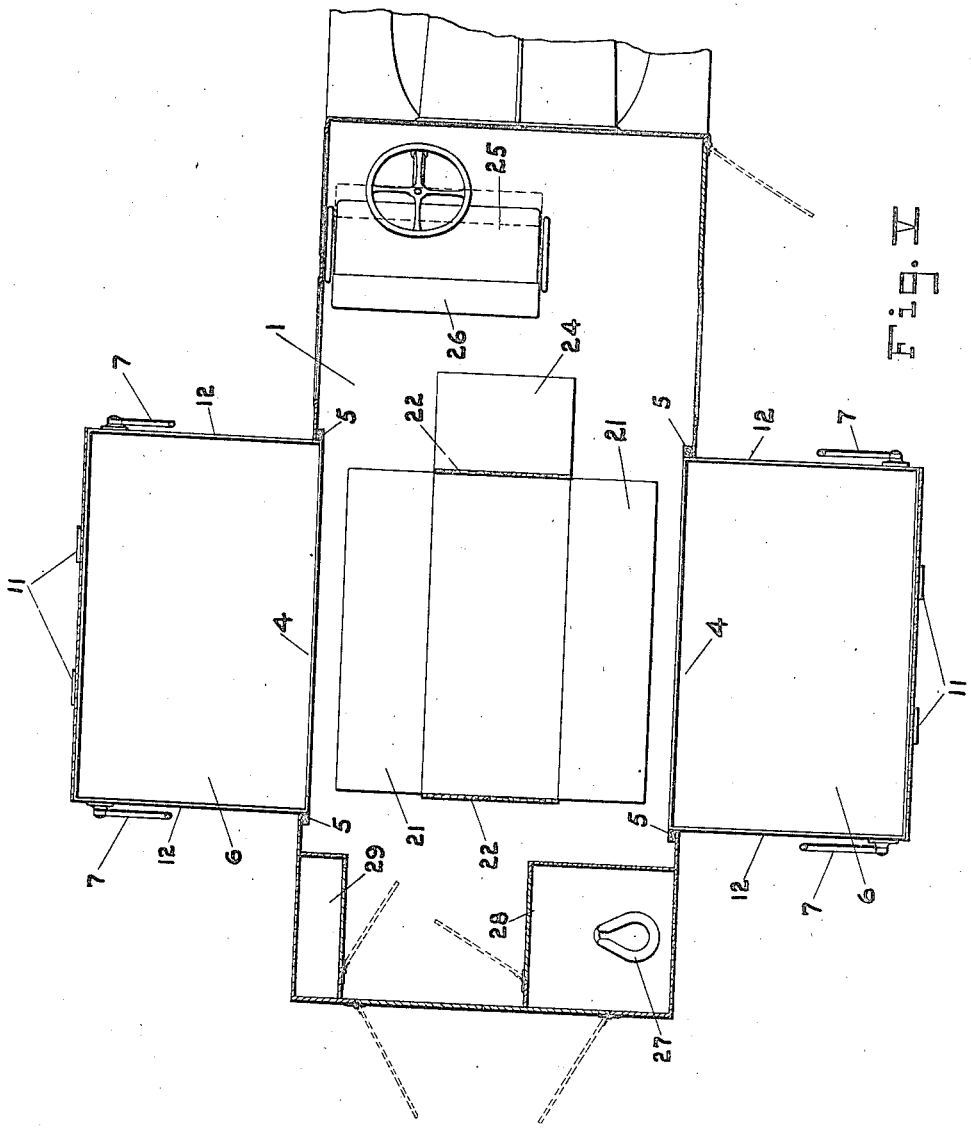
Figure 5 is a horizontal section taken on a plane above the table, showing the arrangement of the interior with the table and alcoves unfolded.

Referring to the drawings in detail, the vehicle body 1 is of a type commonly used on vans, and is arranged as a portable house. A large opening 4 is left in the rigidly constructed side of the truck and is reinforced by suitable frames 5.

Hinged to the lower side of each of the frames 5 is a tray 6 containing suitable bedding and substantially filling the frame 5 when turned into vertical position and adapted to be swung down into horizontal position for use. At each end of the tray is a jointed rod 7, one end of which is pivotally attached to the frame 5, the other end being pivotally attached to the tray 6 to serve as a support for the tray when it is swung down before the housing is in place and to assist in supporting the bed after the housing has been erected over it. When the bed is swung into vertical position, the jointed rods buckle, as shown in Figure 4.

Hinged to the upper side of the frame 5 is a flat member 8 which forms a portion of the side of the vehicle body and completely covers the bottom of the tray 6 when it is folded into the frame 5. Suitable latches 9 hold the flat member 8 in place when it is in vertical position.

A wall section 10 is hinged to the lower edge of the flat member 8 and folds to a position between the flat member 8 and the bottom of the tray 6 when the device is folded. When the flat member is swung outwardly and the tray 6 lowered, the wall section 10 is adapted to be turned down and fastened to the side of the tray by means of hooks or catches 11.

Hinged to each end of the tray 6 is a trapezoidal flap 12 containing a small window 13. These flaps are folded over the bedding in the tray when the bed is to be turned up into the side of the vehicle body and are turned up to form the ends of the alcove when the bed is let down. When the flaps 12 are turned up, their upper and outer edges engage the flat member 8 and the wall section 10, so that they serve as struts to hold the flat member and wall section in place to assist in supporting the tray.

I have shown the bed and alcove as built into a vehicle body, but it is obvious that the frame 5 with the tray 6 and the foldable alcove may be manufactured and sold separately to be used in cottages or vehicle bodies.

Built upon the floor of the vehicle body between the alcoves is a refrigerator 20, to the top of which are hinged leaves 21 which, when lowered, form a table extending between the beds in the alcoves so that the beds serve as seats at the sides of the table. A frame 22 containing drawers 23 is built from the top of the table to the ceiling. When the table leaves 21 are turned up they form a compartment in the frame 22 within which articles may be packed for transport. A drop shelf 24 adapted to support an oil stove is hinged to one end of the table.

The driver's seat 25 is stationary, but the back 26 is adapted to be swung like the back of a railway coach seat so that the occupant may face the interior.

A toilet 27 is built into the right rear corner of the vehicle so that one of the rear doors opens into it, and is also provided with a door 28 opening into the interior of the vehicle. A small wardrobe 29 occupies the left rear corner of the body, and a water tank 30 is carried at the rear of the running board on the right side.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a wall having an opening therein, a bed hinged at the lower side of said opening to turn thereinto, a flat member hinged at the upper side of said opening and adapted to cover the same when said bed is therein, a wall section hinged to the lower edge of said flat member, and wall sections hinged to the ends of said bed, said flat member and wall sections forming an alcove to house said bed when the same is turned out of said opening.

2. In a device of the class described, in combination, a vehicle body, said vehicle body having in one of its walls a foldable alcove, said alcove containing a bed adapted to serve as a seat, and a table fixedly secured within said vehicle body adjacent said alcove, said table having a leaf adapted to be turned into position for use by the occupant of said seat.

3. In a device of the class described, in combination, a table, foldable alcoves on each side thereof adjacent thereto, said alcoves containing beds adapted to serve as seats, said table having leaves adapted to be lowered into position for use by occupants of said seats, said leaves adapted when raised to form walls of a compartment within which articles may be placed.

MARTIN DIEFENDERFER.

Witnesses:
A. P. MANNING,
B. L. KENNICOTT.